United States Patent [19]
Roggero

[11] 3,771,036
[45] Nov. 6, 1973

[54] BATTERY POWERED VEHICLE TRACTION SYSTEM

[75] Inventor: Alberto Roggero, Giaveno (Turin), Italy

[73] Assignee: FIAT Societa per Azioni, Turin, Italy

[22] Filed: Oct. 11, 1972

[21] Appl. No.: 296,697

Related U.S. Application Data
[63] Continuation-in-part of Ser. No. 5,429, Jan. 23, 1970, abandoned.

[30] Foreign Application Priority Data
Jan. 7, 1972 Italy .............................. 67045 A/72
Feb. 3, 1969 Italy ......................... 854.210/69

[52] U.S. Cl. ................. 318/139, 318/327, 318/695, 318/439, 318/401
[51] Int. Cl. ............................................. H02p 5/00
[58] Field of Search .................... 318/139, 138, 327, 318/326, 401, 154, 439, 695

[56] References Cited
UNITED STATES PATENTS
2,958,812  11/1960  Noodleman .......................... 318/27
3,222,582  12/1965  Heyman et al. ...................... 318/139

Primary Examiner—G. R. Simmons
Attorney—Richard C. Sughrue et al.

[57] ABSTRACT

A battery powered vehicle traction system has an asynchronous traction motor the stator coils of which are energized in sequence, in opposed pairs, from a battery source through a rotary distributor. The distributor is driven, at a speed determined by a control member — e.g., the accelerator pedal - by an auxiliary motor powered from the same battery source or from an auxiliary battery.

5 Claims, 18 Drawing Figures 3,771,036

BATTERY POWERED VEHICLE TRACTION SYSTEM

REFERENCE TO RELATED APPLICATION

This application is a continuation-in-part of application Ser. No. 5,429, filed Jan. 23, 1970, now abandonment.

BACKGROUND OF THE INVENTION

1. Field of the Invention

This invention refers to battery powered vehicle traction systems.

2. Description of the Prior Art

In electrically powered motor vehicles electric motors with rotating magnetic fields are generally employed.

Ordinary induction motors, also called asynchronous motors, are based on the principle of the rotating stator field.

Speed regulation of these motors can be effected by varying the frequency of the polyphase supply, that is, by varying the rotational speed of the rotary field. Such speed regulation is also advantageous because it permits variation of the torque of the motor, transforming the motor, in effect, into a generator for producing a braking torque, by suitably adjusting the difference, or slip, between the speed of the motor and that of the rotary field.

For vehicles powered by batteries, this type of speed regulation requires, on the other hand, some complexity in the circuitry associated with the batteries, with inevitable complications of installation, unreliability, high cost and limited efficiency.

SUMMARY OF THE INVENTION

To avoid these difficulties, a main object of this invention is to provide a motor system fed by a direct current source in which there is no transformation to alternating current in the speed regulating portion of the system.

A further object of this invention is to provide a regulating system, in such a system, which is able to effect a continuous and progressive variation of the motor speed.

Another object of this invention is to provide for regulation of the torque of the motor both in a range of positive values, that is, under driving or accelerating conditions, and in a range of negative values, that is, under braking or decelerating conditions. Lastly, an object of this invention is to realize the above mentioned objects with a system of simple construction which is safe in operation.

BRIEF DESCRIPTION OF THE DRAWINGS

Throughout the drawings the same reference numerals are used to designate the same or corresponding parts.

DESCRIPTION OF THE PREFERRED EMBODIMENT

Figure 1:
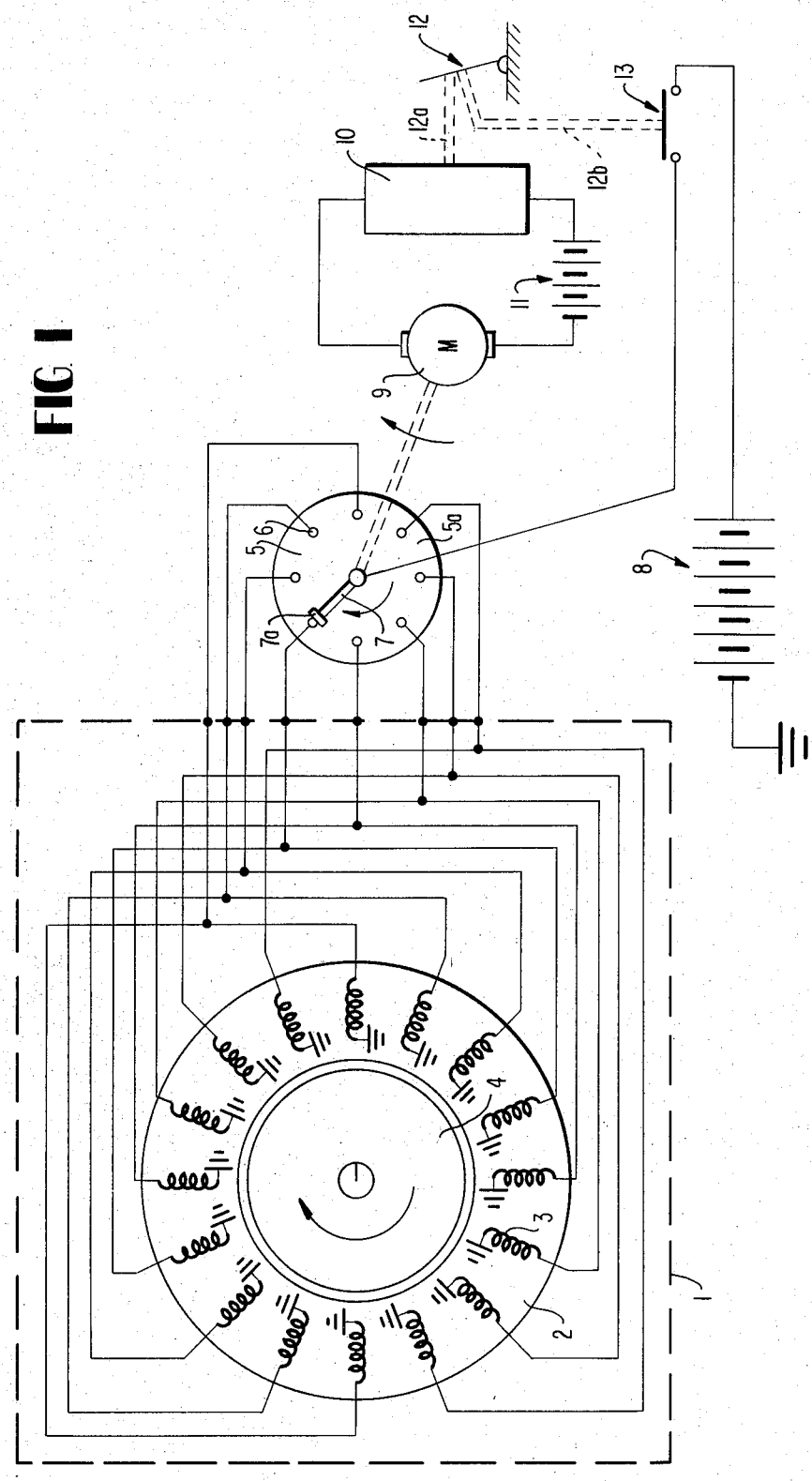
FIG. 1 is a schematic illustration of an electric traction system according to one embodiment of the invention.

With reference first to FIG. 1, 1 indicates, generally, an asynchronous motor. The motor 1 has a stator 2 housing an even number of coils 3 which generate a rotary field.

Each stator coil 3 is connected parallel with the coil diametrically opposite to it, while one end of each coil 3 is connected to earth. Each parallel-connected pair of coils 3 is connected to a respective fixed contact stud 6 of a rotary distributor 5.

The contact studs 6 are distributed at equal circumferential spacings around a circle on an insulating disc 5a of the rotary distributor 5. The pairs of coils 3 are energized through the studs 6, each for a short time and in a cyclic sequence, from a battery 8 connected to a movable control 7a carried by a rotary arm 7 of the distributor 5 which is mounted for rotation about the center of said circle to contact each stud 6 in turn.

The arm 7 of the distributor 5 is rotated by a direct current auxiliary electric motor 9 fed by a battery 11 which is connected to the motor 9 through a regulating unit 10. The unit 10 permits variation, over a continuous range, of the speed of the auxiliary motor 9, and also inversion of the direction of the rotation of the motor 9.

The regulating unit 10 is controlled by means of a manual control member 12 through a mechanical linkage 12a, shown diagrammatically by broken lines. The member 12, which is in general formed by the accelerator pedal, is arranged, through a further mechanical linkage 12b, also shown in broken outline, to close a switch 13 in the first part of its movement in a speed-increasing sense. The switch 13 when closed completes the circuit including the battery 8, the rotary distributor 5 and the motor 1.

The system of FIG. 1 operates as follows.

Successive pairs of coils 3 are energized from the rotary distributor 5, the stator field rotating with a speed equal to and in a direction determined by that of the distributor arm 7.

The rotor 4 of the motor 1, which is structurally similar to that of an ordinary induction motor, is driven into rotation by the rotating stator field in the same manner as the above-mentioned asynchronous motors.

The speed of rotation of the rotor 4 differs from that of the rotating stator field by a value normally defined as the "slip speed" S. The speed of rotation of the traction motor 1 is therefore directly related to the speed of rotation of the magnetic stator field, which in its turn depends on that of the rotary distributor of the auxiliary motor 9 driving the distributor arm 7.

The regulating unit 10, inserted in the circuit of the auxiliary motor 9, performs the desired speed regulation of the auxiliary motor 9 and, therefore, of the traction motor 1, in response to commands derived from the control member 12.

Figure 2:
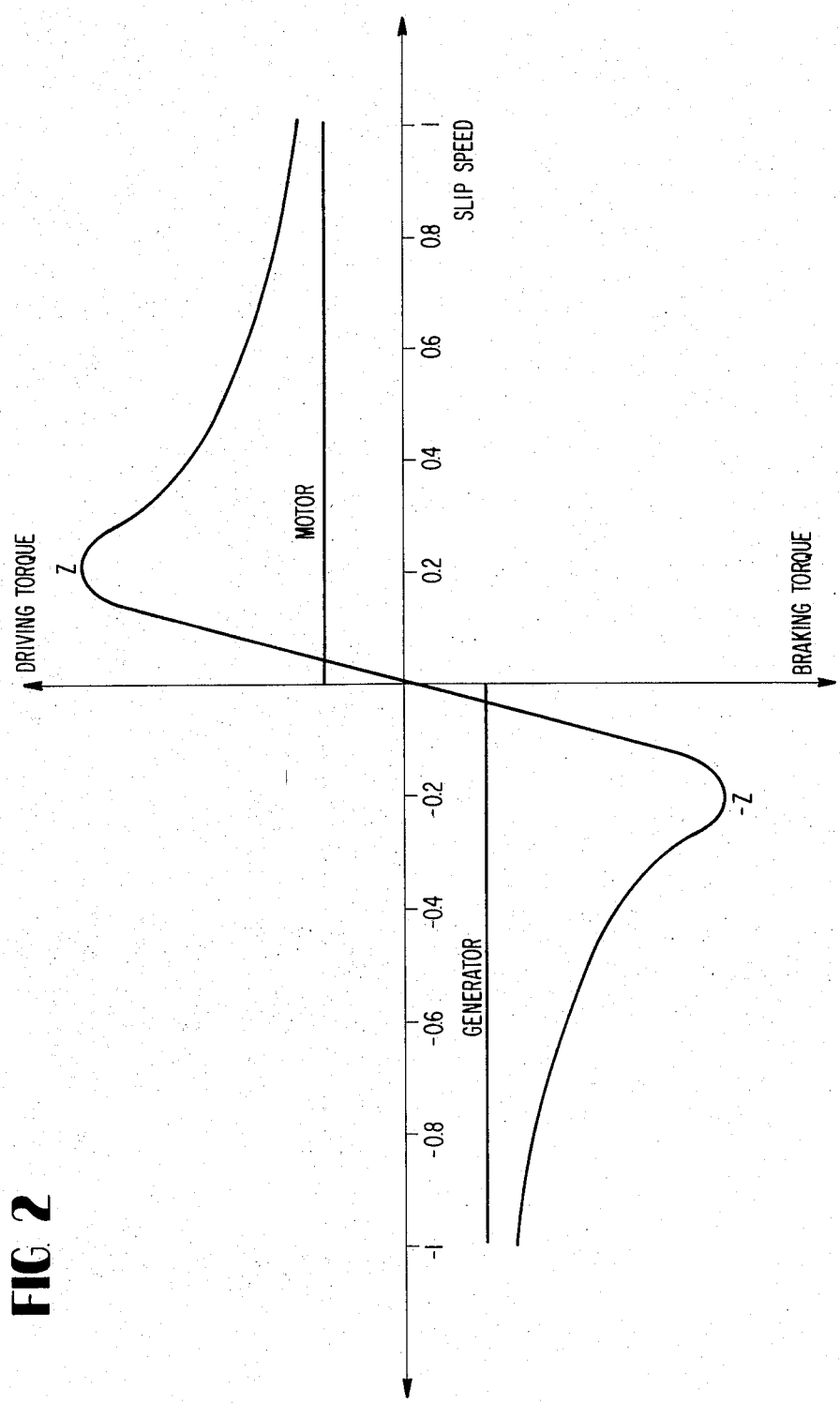
FIG. 2 is a diagram showing the variation of the torque of the asynchronous motor of said system as a function of the rotor slip speed S, as hereinafter defined, of the motor.

The diagram of FIG. 2 illustrates the variation of the torque of the asynchronous motor 1 in relation to the rotor slip. It will be observed that:

a. for positive values of the slip speed S — that is, speeds of the stator magnetic field in excess of that of the rotor — the system behaves as a motor imparting a driving torque;

b. for negative values of the slip speed S — that is, speeds of the stator field less than that of the rotor — the system behaves as a generator, giving rise to a braking torque;

c. for both positive and negative values of the slip speed a maximum of driving or braking torque is obtained at a certain value of slip speed;

d. for zero slip — that is, the speed of the rotary stator field equal to that of the rotor — both the torque and the counter-electromotive force of the motor are zero.

From the above it will be seen that it is possible to regulate the torque of the motor, both for positive and negative values of the above-mentioned rotor slip speed. Such regulation is obtained in the case of the modified system of FIG. 3 as follows.

Two tachometers 14, 15 have respective drive connections 14a, 15a, shown in broken outline, to the shaft of the traction motor 1 and of the rotary distributor 5 respectively. The tachometers 14, 15 are electrically connected on one side to earth and on the other side to the regulating unit 10 of the auxiliary motor 9. The regulating unit 10 must in this case be capable of double control.

A current limiter 16 of the electromechanical or electronic type is inserted in the main supply line including the battery 8, the rotary distributor 5 and the traction motor 1.

The electrical signals from the two tachometers 14 and 15 are subtracted from each other in the regulating unit 10 to provide an output signal proportional to the rotor slip speed S of the traction motor 1.

In response to this output signal, the regulating unit 10 of the auxiliary motor 9 is adapted to maintain, through an accurate regulation of the auxilary motor 9, the slip speed of the traction motor 1 in the range of values of the torque characteristic (FIG. 2) included between the points Z and -Z, that is, in the linear region of said characteristic.

In a conventional asynchronous motor installation, when the slip speed is zero, the power taken from the current supply is limited by the reactance of the stator coils 3; in the system of the present invention, on the other hand, by feeding the motor with direct current, the current taken at zero slip speed is limited by the ohmic resistance of the coils 3 only.

As a consequence, when the rotor slip speed is zero, or nearly zero, it is necessary to limit in some ways the current, so as not to impair the overall efficiency of the vehicle drive. For this purpose when the signals from the tachometers 14 and 15 indicate that the magnitude of the slip speed is less than a limit value predetermined upon assembly of the system, the regulating unit 10 puts into action the current limiter 16 so as to reduce the current taken to within acceptable limits.

Thus it is possible to obtain quite accurate regulation of the torque of the traction motor 1 as a function of the rotor slip speed.

Figure 4:
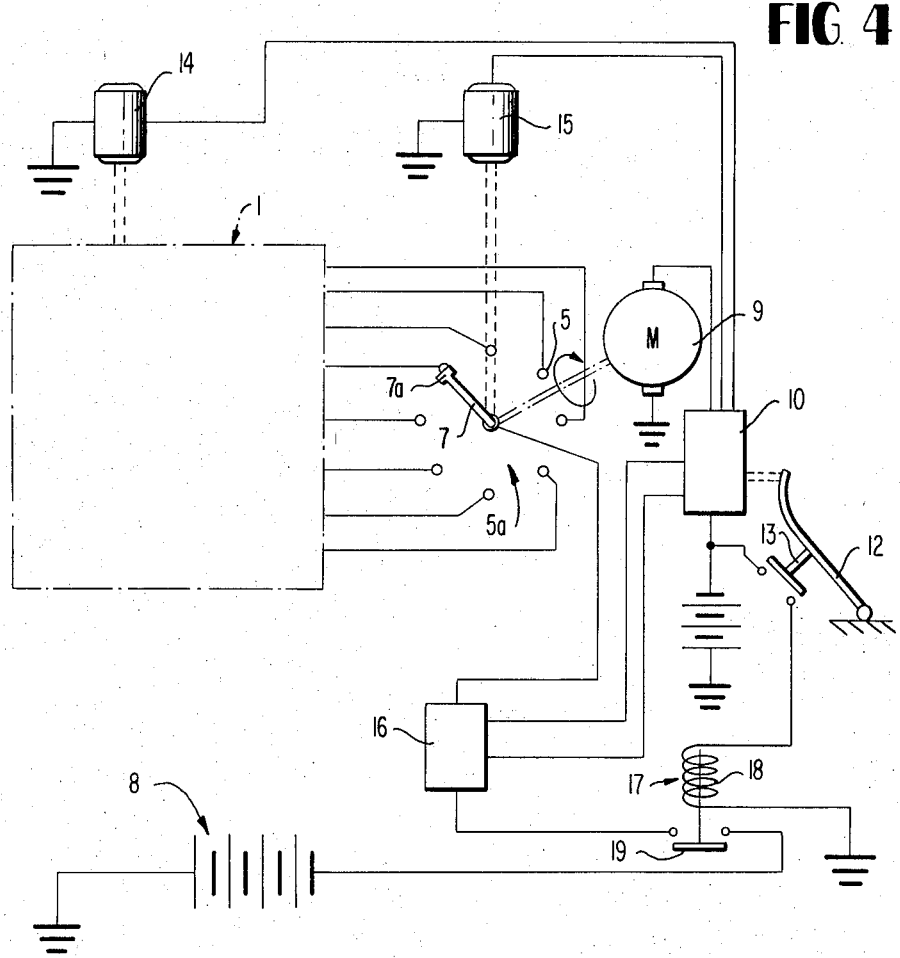
FIG. 4 is a schematic illustration of a third embodiment of the system of the invention.

In the embodiment shown in FIG. 4, the closing of the circuit including the main supply battery 8, the current limiter 16, the distributor 5 and the traction motor 1, instead of being carried out directly through the switch 13 of FIG. 1, is effected by a relay 17 controlled by movement of the control member 12. For this purpose the switch 13, which is directly operable by the control member 12, is connected in a branch circuit with the battery 11, said branch circuit including the coil 18 of the relay 17. The relay 17 has an associated switch 19 connected between the battery 8 and the current limiter 16.

Figure 3:
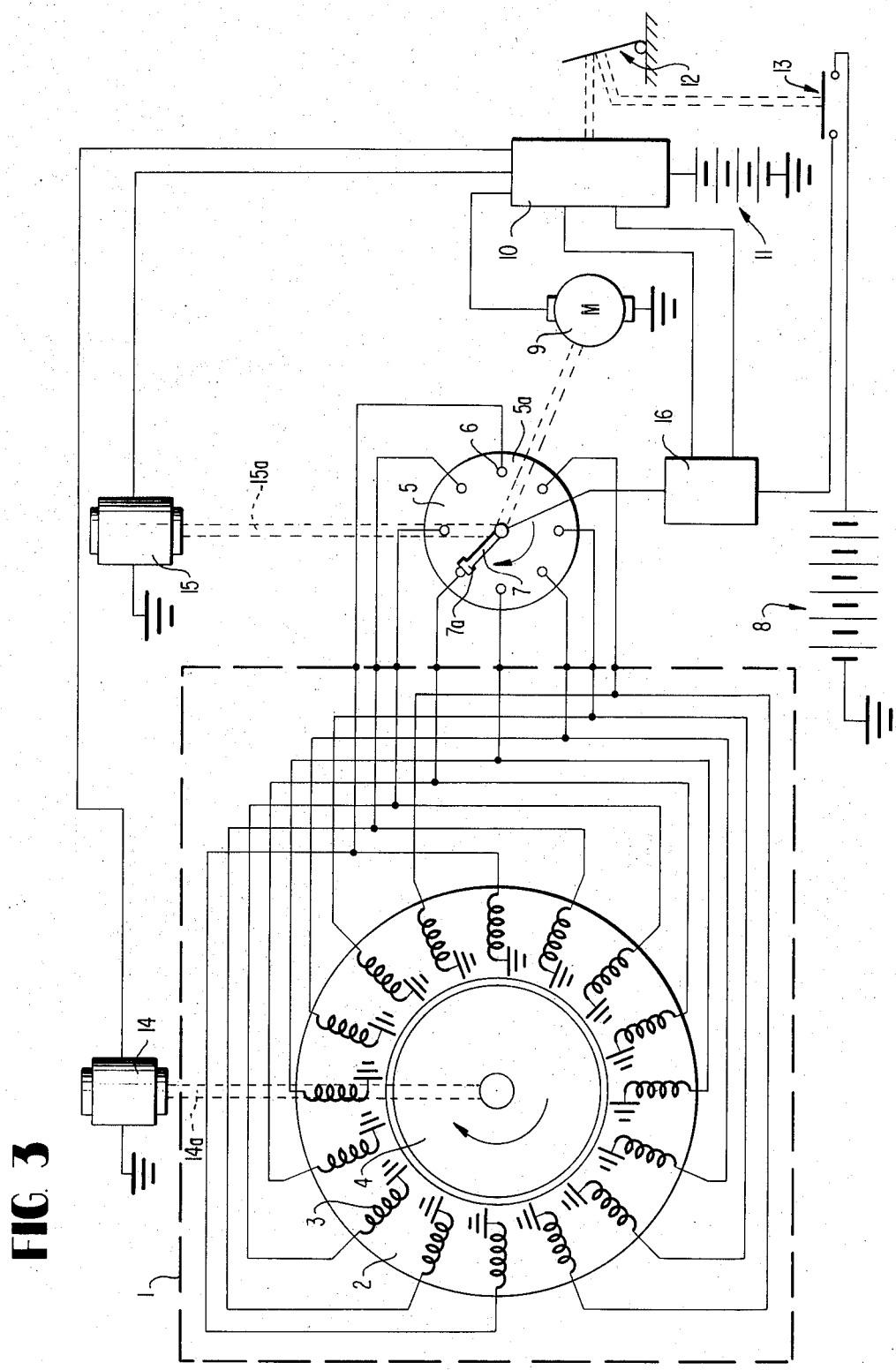
FIG. 3 is a schematic illustration of a second embodiment of the system of the invention.

In FIG. 4 the relay 17 is inserted in the circuit of the system illustrated in FIG. 3, but it can be inserted without any inconvenience in the system shown in FIG. 1.

Figure 5:
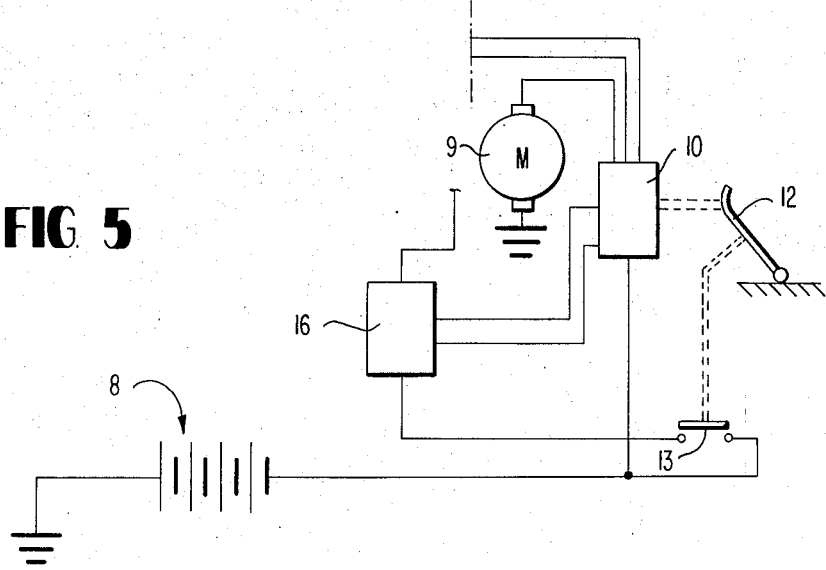
FIG. 5 is a schematic illustration of a fourth embodiment of the system of the invention.

In the embodiment shown in FIG. 5 the battery 11 supplying the regulating unit 10 and the auxiliary motor 9 has been dispensed with and the unit 10 and auxiliary motor 9 are connected directly in the circuit of the battery 8 in parallel with the circuit of the traction motor.

The regulating unit 10 and tachometer 14 and 15 may be described with reference to FIGS. 6–18.

Figure 6:
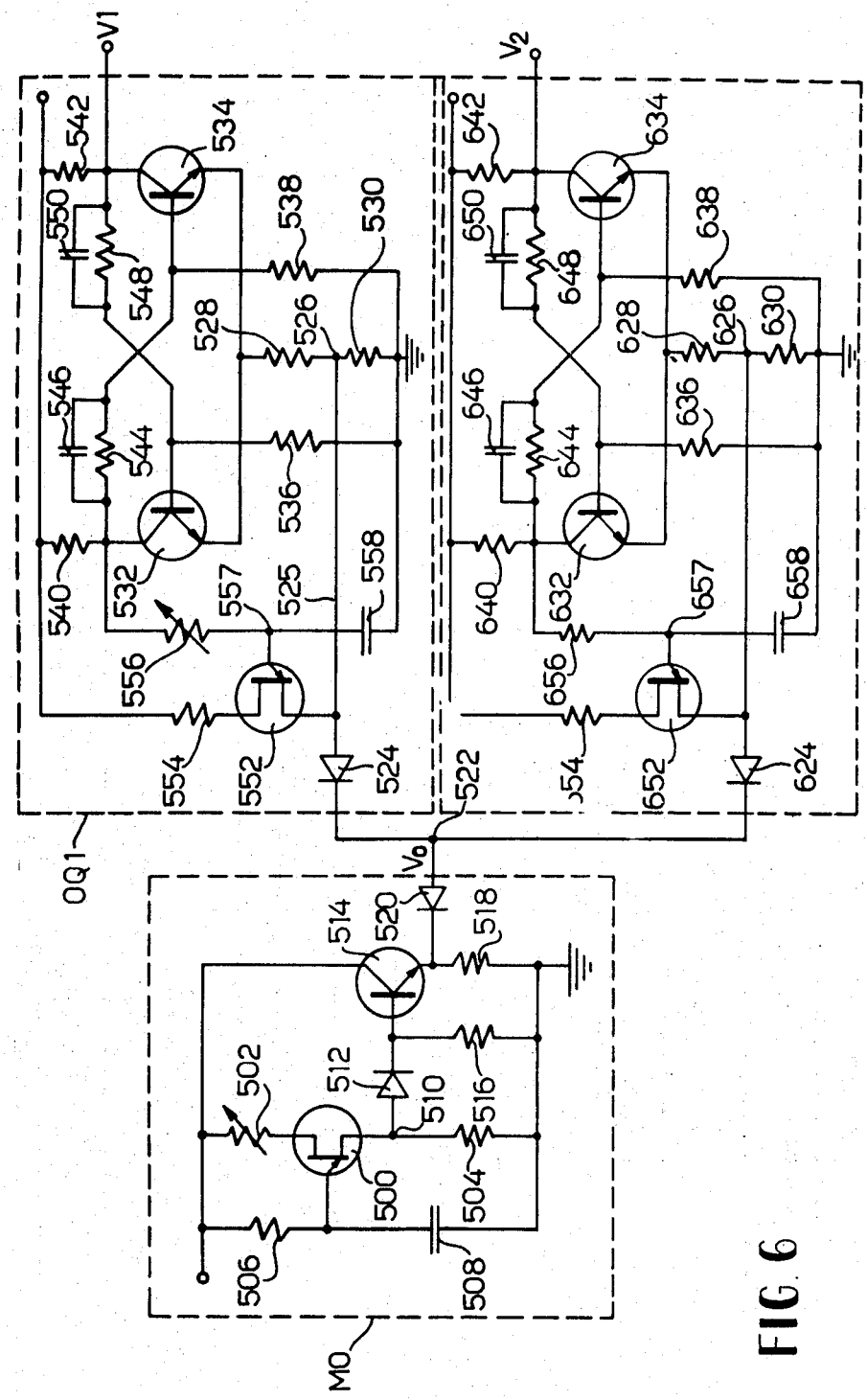
FIGS. 6, 7 and 8 represent the circuitry of the regulating unit according to this invention.

With reference to FIG. 6, there will first be described generator means of square waves OQ1, OQ2 synchronized by a master relaxation oscillator MO.

Figure 9:
FIGS. 9, 10, 11, 12, 13, 14, 15, 16, 17 and 18 are graphs of waveforms useful to illustrate the functioning of this invention.
Figure 10:
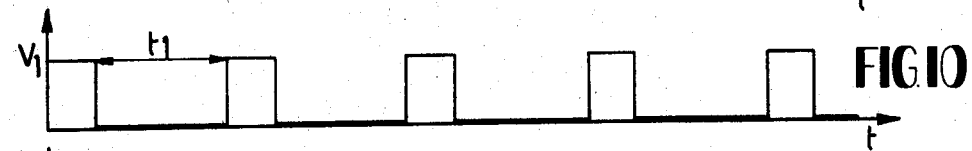

In FIG. 6 a unijunction transistor 500 forms, together with polarization resistors 502, 504 for the two bases and with time constant circuit formed by resistor 506 and by a condensor 508, a relaxation oscillator, which emits short pulses $V_o$ on an output terminal 510 represented in the graph of FIG. 9. These pulses are transferred by the diode 512 on the base of transistor NPN 514, inserted as an emitter follower, polarized by a base resistor 516 and by an emitter resistor 518. The pulses transferred by the transistor 514 on its own emitter are transmitted by a diode 520 to a point 522 from where the pulses are transferred by a further diode 524 to a junction 526 of two resistors 528, 530, forming the emitter polarization of a bistable Eccles-Jordan multi-vibrator comprising, besides the two said resistors, two transistors 532, 534, two base polarization resistors 536, 538, two collector polarization resistors 540, 542, and two combinations in parallel respectively of a resistor 544 and of a condensor 546, and of a resistor 548 and of a condensor 550, for the base-collector coupling.

A unijunction transistor 552 has a base connected to the feeding system through a resistor 554, the opposite base connected to the cathode of the diode 524, and th emitter polarized by a time constant circuit formed by a rheostat 556 and a condensor 558. The unijunction transistor 552 functions like the relaxation oscillator described above, but its emitter supply is present only when the transistor 532 of the Eccles-Jordan multi-vibrator is interdicted. Therefore, supposing that an impulse applied to the junction 526 by the diode 524 causes the switching of the bistable multi-vibrator from the condition in which the transistor 532 is conductive to that in which is not conducting, the unijunction transistor 552 together with the circuit 556, 558 acts as a delay circuit, because, beginning from the instant in which the collector of the transistor 532 becomes high, the condenser 558 recharges through the reheostat 556, to cause after a time determined by the time constant of the divider 556, 558, the trigger of the unijunction transistor 552, and therefore the generating of a pulse on the line 525 to cause the switching of the bistable multivibrator, and to restore therefore the transistor 532 to conduction.

As such switching inhibits the functioning of the delay circuit, the successive reswitching of the multivibrator can only be caused by a successive pulse coming from the master oscillator, with a new triggering of a cycle of operation of the delay circuit.

The rheostat 556 can be regulated by an accelerator pedal 12 of the vehicle.

The shape of the resulting square wave $V_1$ present on the function 522 is furthermore applied to a second square wave generator OQ2, identical to the generator of square wave OQ1, except for the fact that the rheostat 556 is replaced by a fixed resistor 656. The components of the square wave generator OQ2 corresponding to the components of the square wave generator OQ1 have been designed with the same numbers increased by 100.

Figure 11:
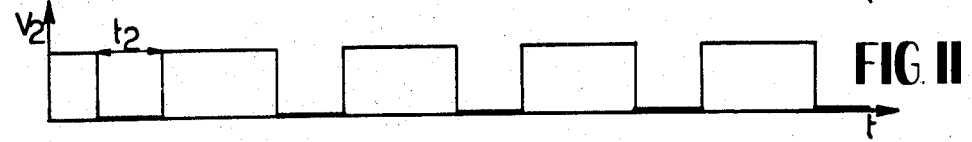
Figure 12:

Also in this case the square wave generated $V_2$ is taken from the junction 657, and is represented in the graph of FIG. 11. It is similar to that generated by the generator OQ1, except that the duration of the spaces will be fixed instead of controlled by the accelerator pedal.

Figure 7:
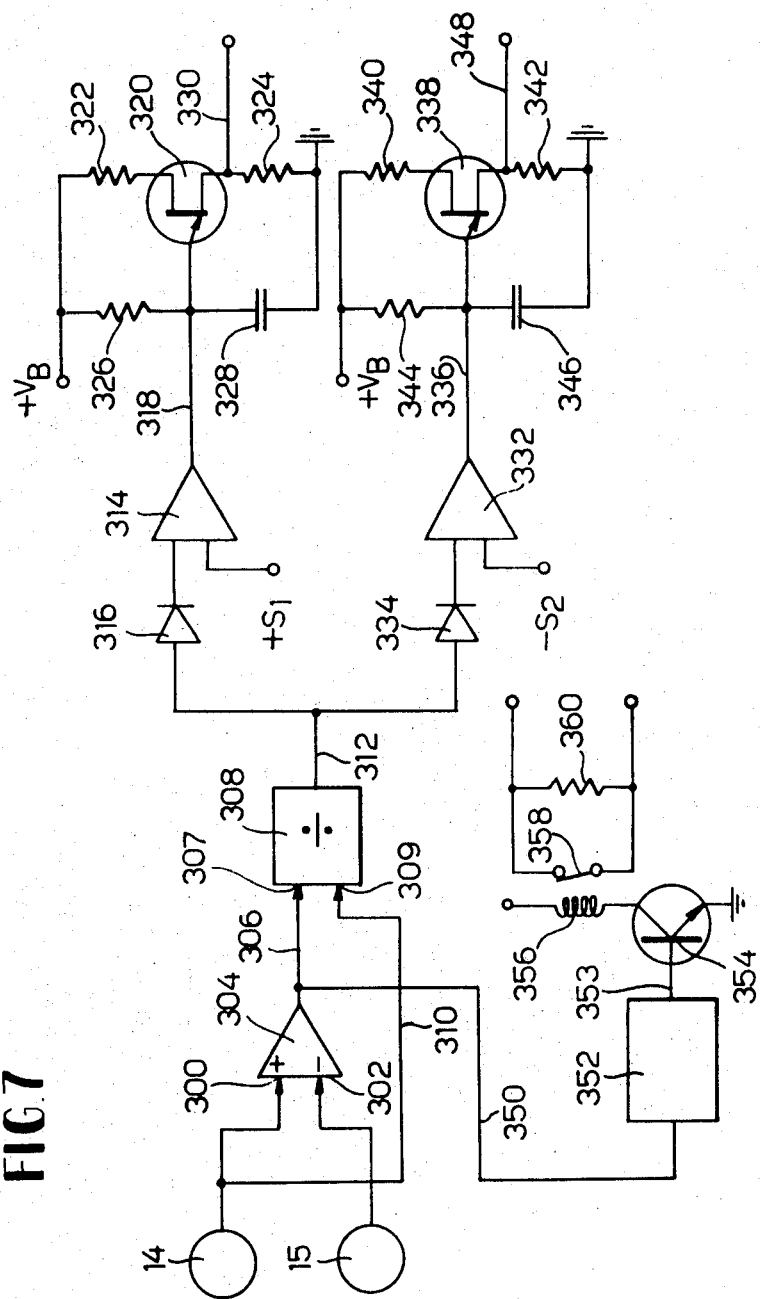

With reference to FIG. 7, there will now be described a device for generating a series of pulses when the slip of the traction motor exceeds a positive or negative threshold. The tachometric signals generated by the tachometers 14, 15 in FIGS. 3, 4 and 5 are applied respectively to the non-inverting input 300 and to the inverting input 302 of a differential amplifier 304. Therefore the output of such differential amplifier, on the line 306, is given by the difference between the rotational speed of the rotating distributor 5 which is equal to the rotation speed of the stator field of the traction motor and the rotational speed of the rotor of the traction motor. Such signal is applied to a first input 307 of a dividing circuit 308, the second input 309 of which receives the stator tachometer signal through a line 310. The dividing circuit 308 can be of any suitable type, and in particular can be of the type described in "A Dissertation on specifying, measuring and using very high-speed digital-to-analog converts," by James Pastonza published by Analog Devices, Cambridge, Mass., U.S.A., in May 1968, on page C003- 40-5/68 (FIG. 4).

It generates therefore on its own output line 312 a signal proportional in the relation between the signal on the input 306 and that on the input 310, and therefore proportional to the slip of the traction motor. The slip signal is applied on one side to a threshold circuit 314, through a diode 316 placed with such a polarity as to let only positive potential pass, and therefore the signal of the output line 318 is given by a normally null signal, and which becomes positive when the slip exceeds a positive threshold $+S_1$ near to the limit of linear functioning of the asynchronous traction motor. Such signal is applied to the emitter of a unijunction transistor 320, having the two bases polarized by respective resistors 322, 324 and the emitter polarized by a time constant circuit comprising a resistor 326 and a condensor 328. The unijunction transistor 320 with its circuit component associated forms therefore a normally blocked relaxation oscillator. When the line 318 becomes high, such relaxation oscillator is blocked and in consequence it begins to emit, on the output line 330, pulses $V_3$, represented in the graph of FIG. 12.

The slip signal present on the line 312 is also applied to a second threshold circuit 332, through a diode 334 connected to let only negative voltages pass, to compare the signal with a negative threshold $-S_2$ corresponding to the limit of negative slip beyond which non-linear operation of the asynchronous traction motor occurs.

Figure 13:
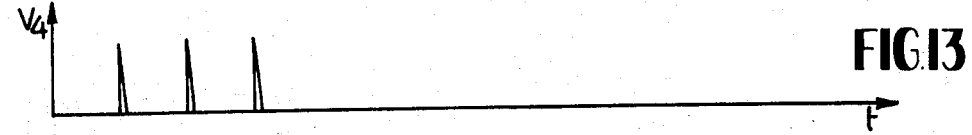

The output line 336 of the threshold circuit 332 is therefore high when the limit is exceeded. The high signal on the line 336 blocks a blocked relaxation oscillator of the type above described, comprising a unijunction transistor 338 having the bases polarized by resistors 340, 342, and the emitter polarized by a combination comprising a resistor 334 and a condenser 346. The outgoing pulses $V_4$ of this relaxation oscillator, represented, as an example, in FIG. 13, are emitted through the line 348.

The signal of speed difference present on the output line 306 of the differential amplifier 304 is also applied, through a line 350, at the inlet of a zero detector circuit 352, which emits a positive signal on an outgoing line 352 when the input signal is included in a narrow interval around zero, delimited by a low positive threhold. The signal on line 352 turns ON a transistor 354, normally OFF, to excite a coil 356 of a normally closed relay. The normally closed contact 358 of the relay, in parallel to a resistance 360, is inserted in the line between the switch 13 and the rotating distributor 5 in FIG. 3. This circuit corresponds to the current limiter 16 of FIG. 3.

It can be seen therefore how the resistance 360, normally short circuited by the contact 358, is inserted to limit the current in the traction motor when the slip is practically null, to avoid excessive absorption of current by the motor.

Figure 8:
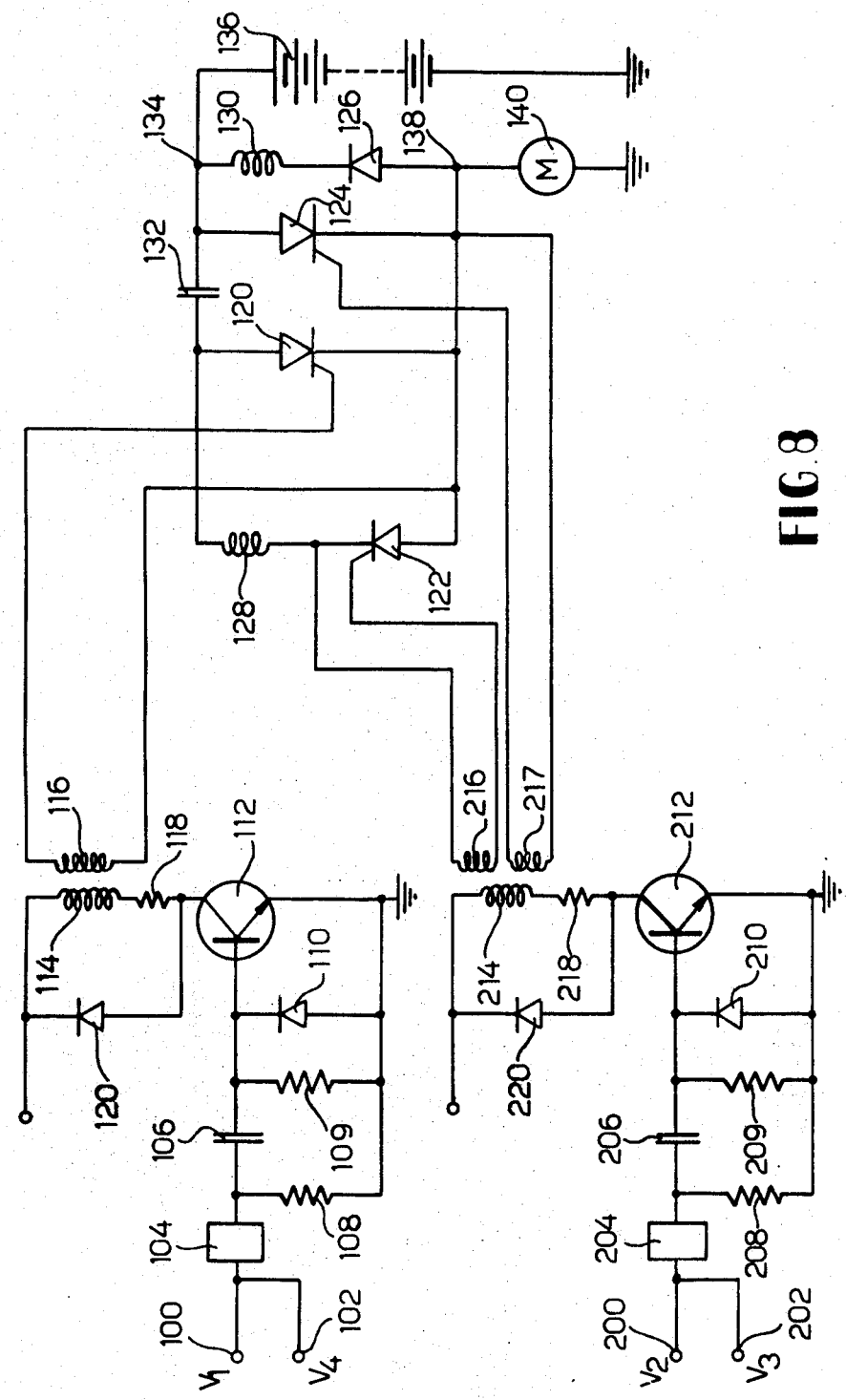

There will now be described, with reference to FIG. 8, a chopper feeding circuit of the auxiliary motor, and its primer circuit. A stopper circuit 104, formed for example by an emitter follower, receives at its own input a signal $V_5$ formed by the sum of the signals $V_1$ and $V_4$ applied to terminals 100, 102.

The signal $V_1$ consists, as has been seen, of a series of long pulses of the duration of $\tau_1$, the trailing edge of which is constantly released by the pulses of the signal $V_o$, and whose leading edges are delayed with respect to the leading edges by an interval of time which can be controlled with the accelerator pedal 12. The signal $V_5$ can therefore include supplementary pulses in the spaces of such wave shape. A second stopper circuit 204 receives on the terminals 200, 202 the signals $V_2$, $V_3$. The signal $V_2$ consists in a succession of pulses of the duration $\tau_2$, whose descending fronts are coincident with the impulses of the signal $V_o$ and therefore with the descending fronts of the signal $V_1$. The duration $\tau_2$ of each pulse however is in this case fixed. In the spaces of the wave form $V_2$ can therefore be summed pulses $V_3$ to give the signal $V_6$ at the output of the stopper circuit 204.

Figure 14:
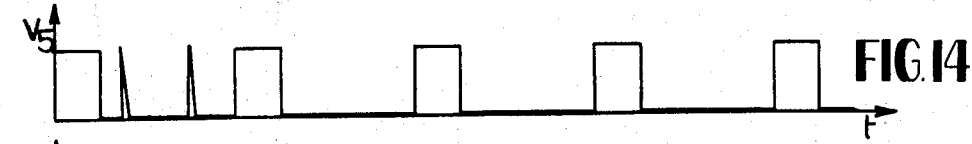
Figure 15:
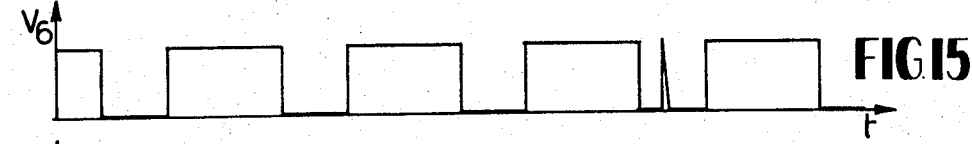

The signals $V_5$, $V_6$ are represented in FIGS. 14 and 15.

Figure 16:
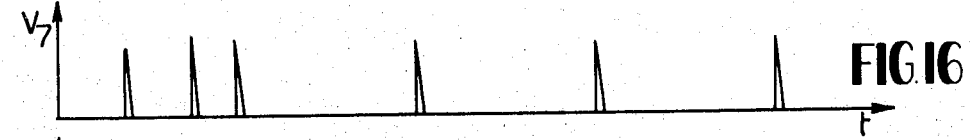

The signal $V_5$ is applied to a differentiating-and-shaping circuit comprising a condenser 106, resistors 108, 109 and a diode 110. Therefore the signal $V_7$, shown in the graph of FIG. 16, is applied at the base of the transistor NPN 112 with grounded emitter, the collector load is formed by the primary coil 114 of a 1:1 transformer having the coil 116 as secondary, and also by a small resistor 118 in series to the coil 114 and a diode 120 against the oscillations of the transformer.

Figure 17:

Similarly the signal $V_6$ is differentiated and shaped in a similar circuit 206, 208, 209, 210, and the signal $V_8$ resulting from it, shown in FIG. 17, is amplified by a transistor NPN 212, as a grounded-emitter, and having as load the primary coil 214 of a transformer provided with two secondaries 216, 217. In series with the primary coil 214 is a protective resistor 218, while a diode 220 neutralizes eventual oscillations of the transformer.

Therefore the signal transferred to the respective secondaries 116 and on the pair of secondaries 216, 217 are formed respectively by a series of short pulses, the first with a repetition frequency controlled by the accelerator pedal 12, the second with constant repetition frequency generated by the ascending fronts of the pulses of the respective signals $V_5$, $V_6$.

The pulse signals present on the secondaries 116, 216 and 217 are applied between the control electrodes and the cathodes of respective thyristors 120, 122, 124, connected to form a "chopper" circuit, together with a simple diode 126, two inductors 128, 130 and a condensor 132. One of the terminals, 134, of the "chopper" is connected to a battery 136 which feeds the auxiliary motor, while the opposite terminal 138 is connected to the auxiliary motor 140.

At the beginning of the operation of the circuit, one of the pulses emitted by the secondary 116 enables the thyristor 120 and the motor 140. As a consequence the condensor 132 recharges, with the right plate positive and the left plate negative. The potential of the anode of the thyristor 120 falls therefore, until it becomes equal to the cathode potential, with consequent turning OFF of the thyristor 120.

Pulses derive then from the secondaries 216, 217, respectively, for the triggering of the thyristors 124, 122. Thus a circuit is created by the right plate of the condensor 132, through the thyristor 124, the thyristor 122, the inductor 128, up to the left plate of the condensor 132. The condensor 132 recharges and discharges with opposite polarity, due to the action of the inductor 128.

Upon the arrival of a further pulse from the secondary 116, the thyristor 120 is again enabled, its anode is again at a high potential. One creates thus a discharge circuit of the condensor 132, from its left plate, through the thyristor 120, the diode 126, the inductor 130, up to the right plate of the condensor 132. Also in this case the condensor discharges and successively recharges with opposite polarity, due to the action of the inductor 130.

As the condensor is again charged with the left plate with low potential, the arrival of pulses from the secondaries 216, 217 enables again the thyristors 124, 122, and therefore the functioning continues in cycles.

It is evident how the described operation of the "chopper" causes its terminal 138, connected to the auxiliary motor, to pass alternatively from a low potential to a high potential and vice-versa, with a frequency determined by the delay in the appearance of the pulse from the secondary 116. Therefore, by controlling such delay with the pedal 12, one causes a variation controlled gy the mark-to-space ratio of the voltage waveform on the terminal 138, and therefore the auxiliary motor 140 is fed with voltage pulses of a length depending on the control given with the accelerator pedal 12.

Figure 18:
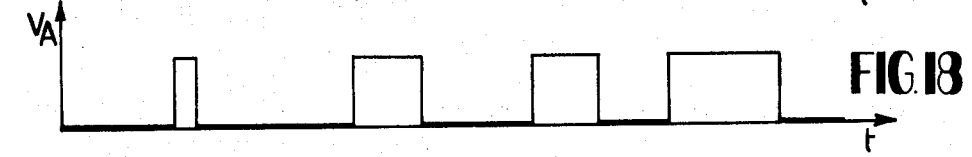

FIG. 18 shows the behavior of the voltage $V_A$ which feeds the auxiliary motor.

The mark-to-space ratio of the supply voltage $V_A$, apart from being under the control of the accelerator pedal which varies the duration $\tau_2$ of the spaces in the sequence of impulses $V_1$, is also conditioned by the eventual presence of pulses $V_5$ or $V_6$, which anticipate respectively the gating pulses of the "chopper" reaching the desired function of containing the running of the motor.

While the invention has been particularly shown and described with reference to the preferred embodiment thereof, it will be understood by those skilled in the art that various changes in form and details may be made therein without departing from the spirit and scope of the invention.

I claim:

1. In a battery-powered vehicle traction system, having an asynchronous traction motor provided with star-connected stator coils, drivingly connected to at least one wheel of the vehicle, converter means connected to the battery and converting the direct current supplied by the battery into a variable current for the stator coils of the traction motor, and a control member adapted to control the converter means, the improvement wherein the converter means comprises:

a. a rotary distributor having fixed contacts connected to the outer ends of pairs of diametrically opposed stator coils, and a cooperating movable contact carried by a rotary arm and connected to a terminal of the battery;

b. an auxiliary motor drivingly connected to the rotary arm of the distributor;

c. a power source for the auxiliary motor;

d. a speed regulator for the auxiliary motor, connected between the power source and the auxiliary motor, and controllable by the control member to vary the speed of the auxiliary motor; and wherein the center junction of the stator coils is connected to the opposite terminal of the battery;

e. a first tachometer drivingly connected to the shaft of the traction motor; and f. a second tachometer drivingly connected to the rotary arm, wherein the first and the second tachometers are electrically connected to the speed regulator to limit the speed of the auxiliary motor when the output signals of the two tachometers differ by more than a predetermined amount.

2. The system as set forth in claim 1, further including a current limiter connected between the battery and the rotary distributor which is controlled by the speed regulator to be normally inoperative and to limit the current to the traction motor when the output signals of the two tachometers differ by less than a predetermined amount.

3. In a battery-powered vehicle traction system, having an asynchronous traction motor provided with star-connected stator coils, drivingly connected to at least one wheel of the vehicle, converter means connected to the battery and converting the direct current supplied by the battery into a variable current for the stator coils of the traction motor, and a control member adapted to control the converter means, the improvement wherein the converter means comprises:

a. a rotary distributor having fixed contacts connected to the outer ends of pairs of diametrically opposed stator coils, and a cooperating movable contact carried by a rotary arm and connected to a terminal of the battery;

b. an auxiliary motor drivingly connected to the rotary arm of the distributor;
c. a power source for the auxiliary motor;
d. speed regulator means connected between the power source and the auxilary motor for controlling the speed of the auxiliary motor, the speed regulator means comprising:
  1. first generator means for generating a first series of pulses;
  2. second generator means for generating a second series of pulses, the second series of pulses being controlled by the control member; and
  3. switching means connected to the auxiliary motor for controlling the voltage applied to the auxiliary motor wherein the switch means turns ON upon the occurrence of a pulse from the first series and turns OFF upon the occurrence of a pulse from the second series; and
e. wherein the center junction of the stator coils is connected to the opposite terminal of the battery.

4. The system as set forth in claim 3, further including
a. a first tachometer drivingly connected to the shaft of the traction motor; and
b. a second tachometer drivingly connected to the rotary arm, wherein the first and the second tachometers are electrically connected to the speed regulator to limit the speed of the auxiliary motor when the output signals of the two tachometers differ by more than a predetermined amount.

5. The system as set forth in claim 4 wherein said speed regulator means comprises:
a. first circuit coupled to the first and second tachometer means for calculating the slip of the traction motor with respect to the auxiliary motor;
b. first threshold circuit means for comparing the slip of the traction motor to a first threshold signal and for producing supplementary pulses in the first series of pulses when the slip exceeds the first threshold signal; and
c. second threshold circuit means for comparing the slip of the traction motor to a second threshold signal and for producing supplementary pulses in the second series of pulses when the slip exceeds the second threshold signal.

* * * * *